US007418272B2

(12) United States Patent
Son

(10) Patent No.: US 7,418,272 B2
(45) Date of Patent: Aug. 26, 2008

(54) BATTERY PACK HAVING A DUAL-TYPE SMART CARD INTERFACE

(75) Inventor: Chang-Bai Son, Seoul (KR)

(73) Assignee: Info Trust, Inc., Seoul (KR)

( * ) Notice: Subject to any disclaimer, the term of this patent is extended or adjusted under 35 U.S.C. 154(b) by 505 days.

(21) Appl. No.: 11/055,904

(22) Filed: Feb. 11, 2005

(65) Prior Publication Data

US 2005/0197169 A1 Sep. 8, 2005

Related U.S. Application Data

(63) Continuation of application No. PCT/KR02/01539, filed on Aug. 12, 2002.

(51) Int. Cl.
*H04M 1/00* (2006.01)
*H04B 1/38* (2006.01)
(52) U.S. Cl. .................. 455/558; 455/550.1; 455/556.1
(58) Field of Classification Search ................. 455/558, 455/557, 572, 573, 575.1, 550.1, 90.3, 343.1, 455/344, 556.1
See application file for complete search history.

(56) References Cited

U.S. PATENT DOCUMENTS

| | | | |
|---|---|---|---|
| 6,179,649 B1 | 1/2001 | An | |
| 6,439,464 B1 * | 8/2002 | Fruhauf et al. | 235/492 |
| 6,634,564 B2 * | 10/2003 | Kuramochi | 235/492 |
| 6,659,356 B2 * | 12/2003 | Kashima | 235/492 |
| 6,776,339 B2 * | 8/2004 | Piikivi | 235/451 |
| 6,945,454 B2 * | 9/2005 | Tournemille et al. | 235/375 |
| 7,137,003 B2 * | 11/2006 | Krishnan et al. | 713/172 |
| 7,175,084 B2 * | 2/2007 | Mennecart et al. | 235/441 |
| 7,299,983 B2 * | 11/2007 | Piikivi | 235/451 |

(Continued)

FOREIGN PATENT DOCUMENTS

DE 198 26 428 A1 12/1999

(Continued)

OTHER PUBLICATIONS

Supplemental European Search Report by European Patent Office on May 13, 2008.

*Primary Examiner*—Sonny Trinh
(74) *Attorney, Agent, or Firm*—Knobbe Martens Olson & Bear LLP

(57) ABSTRACT

The invention relates to a battery pack having a dual-type smart card interface. In one embodiment, a battery pack is connectable to a mobile communication terminal having at least one contact for a power supply and at least one contact for communication with the mobile communication terminal. The battery pack comprises a battery cell, an RF antenna, a slide-type connector, a contact-type connector coupled to the RF antenna, a plurality of battery pack contacts, which are coupled to the mobile communication terminal electrically, for supplying power to the mobile communication terminal and for communication with the mobile communication terminal, an SCR, which is coupled to the slide-type connector and the contact-type connector respectively, for reading data stored on a smart card that is coupled to either the slide-type connector or the contact-type connector and for writing data received from the mobile communication terminal on the smart card, and a battery protection circuit, which is located between the battery cell and the plurality of battery pack contacts, for protecting the battery cell from an instantaneous power surge.

8 Claims, 5 Drawing Sheets

U.S. PATENT DOCUMENTS

| | | | |
|---|---|---|---|
| 2004/0065734 A1 * | 4/2004 | Piikivi | 235/451 |
| 2004/0121793 A1 * | 6/2004 | Weigele et al. | 455/522 |
| 2004/0206812 A1 * | 10/2004 | Tamagno et al. | 235/380 |
| 2004/0215471 A1 * | 10/2004 | Tamagno et al. | 705/1 |

FOREIGN PATENT DOCUMENTS

| | | |
|---|---|---|
| EP | 0 559 244 A2 | 6/1994 |
| EP | 1 093 082 A2 | 4/2001 |
| EP | 1 102 411 A2 * | 5/2001 |
| GB | 2 356 275 A | 5/2001 |
| JP | 1994-162279 | 6/1994 |
| JP | 2000-253119 | 9/2000 |
| JP | 2002-185605 | 6/2002 |
| KR | 2000-0003372 | 1/2000 |
| KR | 20-190040 | 5/2000 |
| KR | 2000-0036900 | 7/2000 |
| KR | 2001-0077791 | 8/2001 |
| KR | 20-0251132 | 10/2001 |
| WO | WO 98/33143 | 7/1998 |

* cited by examiner

BATTERY PACK HAVING A DUAL-TYPE SMART CARD INTERFACE

RELATED APPLICATIONS

This application is a continuation application, and claims the benefit under 35 U.S.C. §§ 120 and 365 of PCT Application No. PCT/KR2002/001539, filed on Aug. 12, 2002 and published Apr. 4, 2004, in English, which is hereby incorporated by reference.

BACKGROUND OF INVENTION

1. Field of the Invention

The present invention relates to a smart card interface. More particularly, the present invention relates to arranging a battery pack having a dual-type smart card interface for both a contact/non-contact subscriber identity module (SIM)-type smart card and an ID-1 type smart card.

2. Description of the Related Technology

In conjunction with wide spread use of the cellular phone, some mobile service providers have developed a financial transaction service, which is a new kind of profitable model, as well as a content download service. The method developed for the mobile financial transaction service uses the inherent number or the telephone number of the cellular phone and levies a charge for the financial transactions together with the charge for the mobile communication service. However, because the cellular phone still lacks in proper security, the aforementioned method cannot provide the requisite assurance that is required during financial transactions.

Accordingly, the mobile service providers and the financial companies want to incorporate the smart card into the cellular phone for maximum security of the financial transaction. The mobile service providers have tried adopting the SIM-type smart card, which has a small size dimension, for various uses of electronic money (e.g., "eCash"), a credit card, and an RF-type traffic card, while the financial companies have tried adopting an ID-1 type smart card, which has same size dimension of a conventional credit card, for use in an ATM and as an RF-type traffic card. However, complicated technical problems still exist to put both the SIM card reader and the ID-1 card reader within the cellular phone in order to meet both groups' requirements.

A cellular phone having a non-contact SIM card reader and an inside antenna was introduced in Korean Patent Publication Gazette No. 2000-0036900 "Cellular phone having RF antenna" and No. 2001-0077791 "Mobile communication terminal having SIM card". However, with the trend of making a light-and-slim cellular phone, it is difficult to reduce the dimensions of other modules of the cellular phone and combine the functions of modules in order to contain the SIM card and reader. To resolve the aforementioned problems, the following device was introduced.

A battery pack that provides enough space by mounting a SIM card reader on the battery pack was introduced in Korean Patent Publication Gazette No.2000-0003372 "A SIM card attached within a battery pack" and Korean Utility model Registration Gazette No.20-0251132. However, these devices relate to the original functions of the SIM card for providing compatibility with various mobile communication networks, and are limited to the non-contact type SIM card that can communicate with the cellular phone only. The RF communication devices using a non-contact type SIM card in the aforementioned devices use C4 and C8 contacts coupled to an RF antenna for wireless communication, however, this configuration has already been introduced by SLC, Inc. Moreover, since this configuration uses C4 and C8 contacts, which are reserved for other use, other applications using C4 and C8 contacts cannot be made any more.

SUMMARY OF CERTAIN INVENTIVE ASPECTS OF THE INVENTION

One aspect of the invention provides a battery pack having a dual-type smart card interface, with which a user can use a contact/non-contact SIM-type smart card and an ID-1 type smart card.

Another aspect of the invention is to assemble the SIM-type card reader, ID-1 type card reader, and an antenna in the battery pack so that phone designers do not need to make a significant change in the structure of the phone.

Another aspect of the invention is to make a non-contact type smart card communicate by wireless.

Another aspect of the invention reduces the possibility of failure resulting from dust infiltrating the inserting holes of SIM card or ID-1 card by including a SIM card reader and ID-1 card reader within the battery pack.

Still another aspect of the invention provides a battery pack connectable to a mobile communication terminal having at least one contact for power supply and at least one contact for communication with the mobile communication terminal, the battery pack comprising: a battery cell, an RF antenna, a slide-type connector, a contact-type connector coupled to the RF antenna, a plurality of battery pack contacts, which are coupled to the mobile communication terminal electrically, for a power supply to the mobile communication terminal and for communication with the mobile communication terminal, a smart card reader (SCR), which is coupled to the slide-type connector and the contact-type connector respectively, for reading data stored on a smart card that is coupled to either the slide-type connector or the contact-type connector and for writing data received from the mobile communication terminal on the smart card, and a battery protection circuit, which is located between the battery cell and the plurality of battery pack contacts, for protecting the battery cell from an instantaneous power surge.

Here, the slide-type connector comprises a plurality of contacts for being electrically connected to the corresponding contacts of the ID-1 type smart card, and the contact-type connector comprises a plurality of contacts for being electrically connected to the corresponding contacts of the SIM-type smart card, and two of the contacts are also connected to the RF antenna, wherein the SIM-type smart card performs wireless communication with an external device through the RF antenna.

Also, the plurality of battery pack contacts comprise: a power supply contact for providing power to the mobile communication terminal, a data receiving contact, which is coupled to the SCR, for receiving data from the mobile communication terminal, a data transmitting contact, which is coupled to the SCR, for transmitting data to the mobile communication terminal, an SCR control contact, which is coupled to the SCR, for receiving a control signal from the mobile communication terminal, and a common contact.

Also, the RF antenna is an RF-Inlay antenna mounted on the external surface of the battery pack.

Still another aspect of the invention provides an arrangement of a battery pack having a smart card reader, comprising: an RF-Inlay antenna, an outer casing having an inserting slot for an ID-1 type smart card, an inner casing having a hole for inserting an SIM-type smart card and a plurality of contact holes, which correspond to a plurality of contacts of a mobile communication terminal, for a plurality of contacts of the battery pack, a battery cell that is located between the outer casing and the inner casing, a first PCB, which is located between the outer casing and the battery cell, mounting an ID-1 type connector in position with respect to a plurality of contacts of an ID-1 type smart card, and a second PCB, which is located between the battery cell and the inner casing, for mounting a plurality of contacts in position with respect to the plurality of contact holes, an SIM-type connector coupled to the RF-Inlay antenna in position with respect to the hole for inserting the SIM-type smart card, a smart card reader (SCR) coupled to the SIM-type connector, the ID-1 type connector and the plurality of contacts respectively, and a battery protection circuit coupled to the battery cell and the plurality of contacts respectively.

Here, the RF-Inlay antenna is mounted on the outer casing. And, the SIM-type connector comprises: a contact frame having a plurality of contacts arranged with respect to each contact of the SIM-type smart card, and an inserting frame in which an end is hinged to an end of the contact frame for supporting the SIM-type smart card.

Yet another aspect of the invention provides a SIM-type smart card having an RF communication module to be inserted into a battery pack that is provided with an RF antenna and an SIM-type smart card connector coupled to the RF antenna, the SIM-type smart card comprising: C1 through C8 contacts according to ISO-7816, L1 contact electrically connected to the RF antenna through the SIM-type smart card connector and formed adjacent to the C4 contact, and L2 contact electrically connected to the RF antenna through the SIM-type smart card connector and formed adjacent to the C8 contact, wherein the L1 and L2 contacts are electrically isolated from the C1 through C8 contacts.

Here, the SIM-type smart card is either a non-contact credit card or a non-contact traffic card.

DETAILED DESCRIPTION OF CERTAIN EMBODIMENTS OF THE INVENTION

Figure 1:
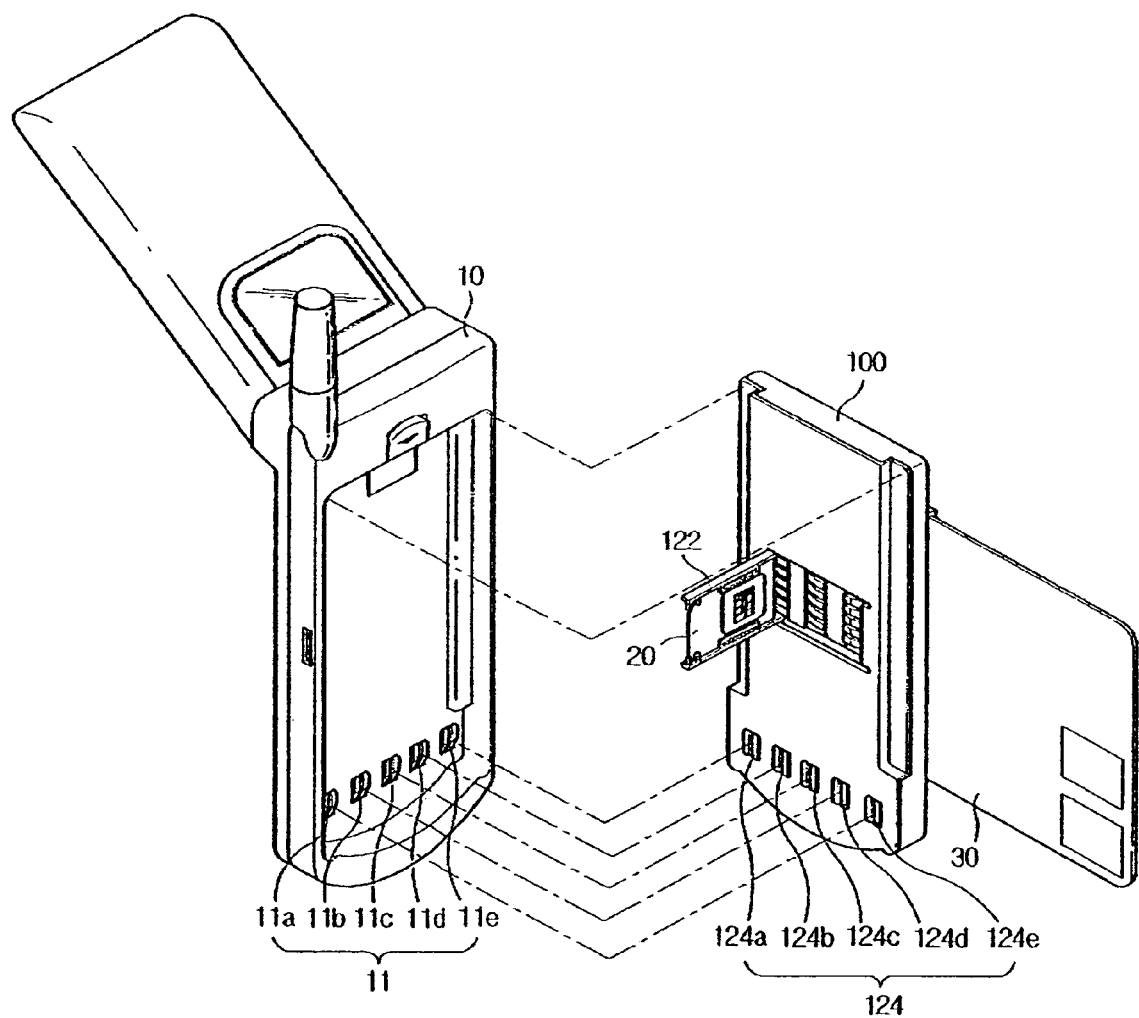
FIG. 1 illustrates a battery pack according to an embodiment of the present invention.
Figure 2:
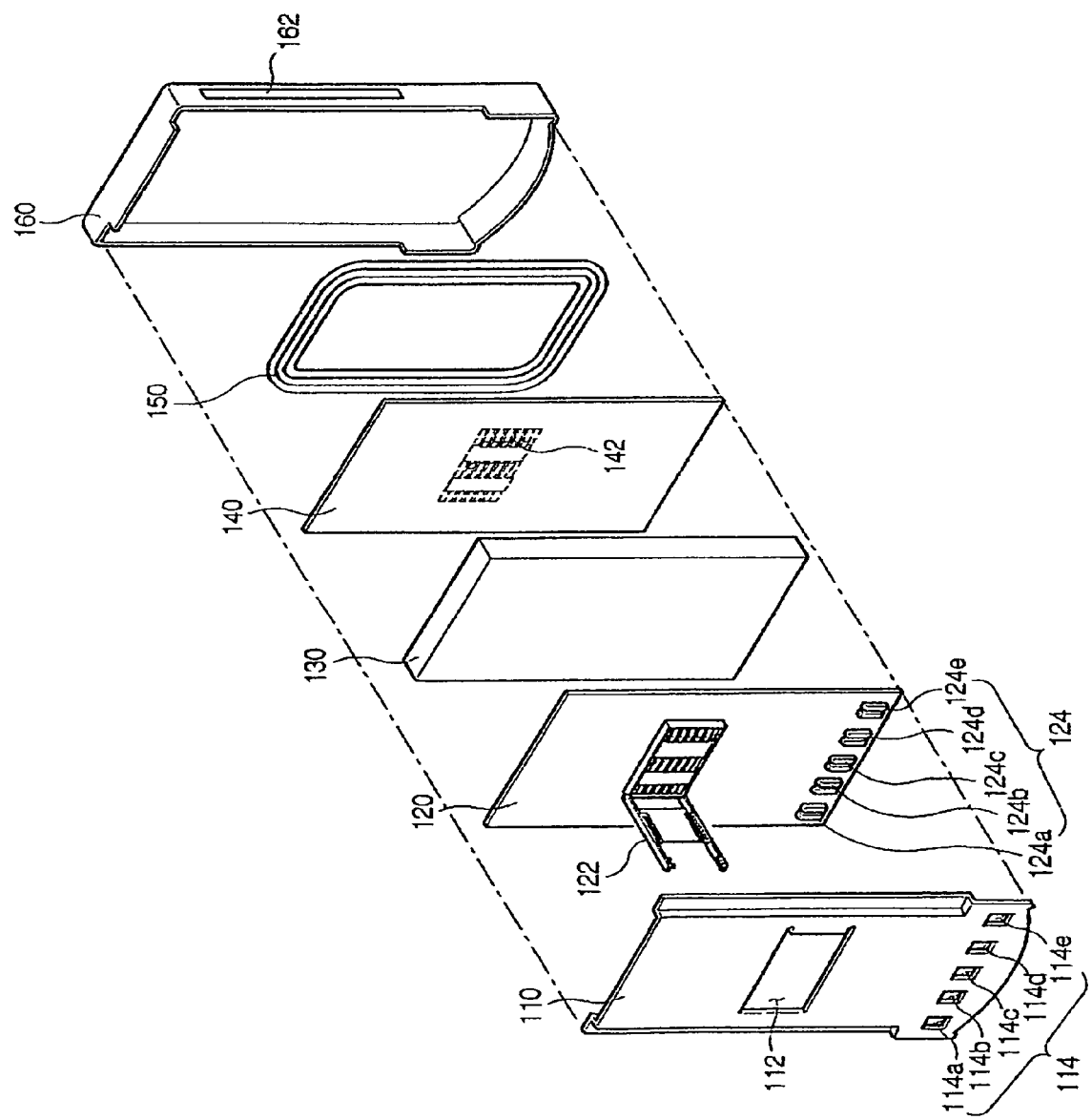
FIG. 2 is an exploded view for illustrating the structure of the battery pack shown in FIG. 1.

FIG. 1 illustrates a battery pack according to one embodiment of the present invention, and FIG. 2 is an exploded view for illustrating the structure of the battery pack shown in FIG. 1. This embodiment uses a slide-type connector and a contact-type connector according to the inserting method for the smart card. The slide-type connector (hereinafter, "ID-1 type connector") is used to electrically connect to and read data from a credit card having an ID-1 type smart card, and the contact-type connector (hereinafter, "SIM-type connector") is used to electrically connect to and read data from a SIM-type smart card having a "chip-like shape". Also, the "SIM-type smart card" used herein comprises a SIM card used in a mobile communication terminal that is used in GSM.

The mobile communication terminal 10 that uses the battery pack 100 according to one embodiment of the present invention is provided with a common contact 11a, an SCR control contact 11b, a data receiving contact 11c, a data transmitting contact 11d, and a power supply contact 11e, all of which are electrically connected to the contacts 124a, 124b, 124c, 124d, 124e (accumulatively abbreviated as "124") of the battery pack 100 and arranged in position with respect to the contacts 124. The contacts 11a through 11e (accumulatively abbreviated as "11") are formed on a PCB of the mobile communication terminal 10, and exposed through the plural holes formed near the bottom end of the mobile communication terminal 10. The term "mobile communication terminal" used herein is employed to mean all computing devices for portable use and communication such as cellular phone and PDA.

The inner casing 110 of the battery pack 100 has plural contact holes 114a, 114b, 114c, 114d, 114e (accumulatively abbreviated as "114") for exposing the contacts and a hole 112 for inserting the SIM-type smart card. The plural contact holes 114 are formed in position with respect to each contact 11 of the mobile communication terminal 10, and each contact 124 of the battery pack 100 is exposed through the contacts holes 114 to be electrically connected to each contact 11. Through the hole 112 for inserting the SIM-type smart card, an inserting frame of the SIM-type connector 122 can be exposed outside of the inner casing 110 and then a SIM-type contact/non-contact smart card 20 can be inserted into the battery pack 100.

The first PCB 120 is located between the inner casing 110 and the battery cell 130, and mounts an SCR 126 (FIG. 5), a battery protection circuit 128 (FIG. 5), the SIM-type connector 122, and plural contacts 124. The SCR 126 and the battery protection circuit 128 are made on the first PCB 120 in the form of an electrical circuit.

The SIM-type connector 122 is mounted in position with respect to the hole 112 for inserting a SIM-type smart card, and comprises plural contacts corresponding to each contact of the SIM-type smart card. Based on ISO-7816 specification, some of the contacts are coupled to the SCR 126. In one embodiment, two contacts are coupled to the RF-Inlay antenna 150, and owing to this connection, it is possible to communicate with the non-contact SIM-type smart card that does not have a self-contained antenna by wireless. The non-contact SIM-type smart card must have a self-contained RF communication module in order to communicate through the RF-Inlay antenna 150 by wireless.

The plural contacts 124 are located in position with respect to the plural contact holes 114, and coupled to the SCR 126 and the battery protection circuit 128 respectively. The contact 124a as a power supply contact (+ polarity) is electrically connected to the power supply contact 11e; the contact 124b as a data receiving contact is electrically connected to the data transmitting contact 11d; the contact 124c as a data transmitting contact is electrically connected to the data receiving contact 11c; the contact 124d as an SCR control contact is electrically connected to the SCR control contact 11b; and the contact 124e as a common contact (− polarity or ground) is electrically connected to the common contact 11a.

The second PCB 140 is located between the battery cell 130 and the outer casing 160, and mounts the ID-1 type connector 142. The ID-1 type connector 142 is mounted in position with respect to the smart card chip contained within the smart card, and comprises plural contacts, which are coupled to SCR 126, corresponding to each contact of the smart card chip.

The RF-Inlay antenna 150 is located between the second PCB 140 and the outer casing 160, preferably. Alternatively, in another embodiment, the RF-Inlay antenna 150 can be mounted on the outer casing 160. The outer casing 160 has an inserting slot 162 for ID-1 type smart card formed on one side of the outer casing 160, and accommodates the first PCB 120, the battery cell 130, the second PCB 140, and RF-inlay antenna 150 by enclosing with the inner casing 110.

Figure 3:
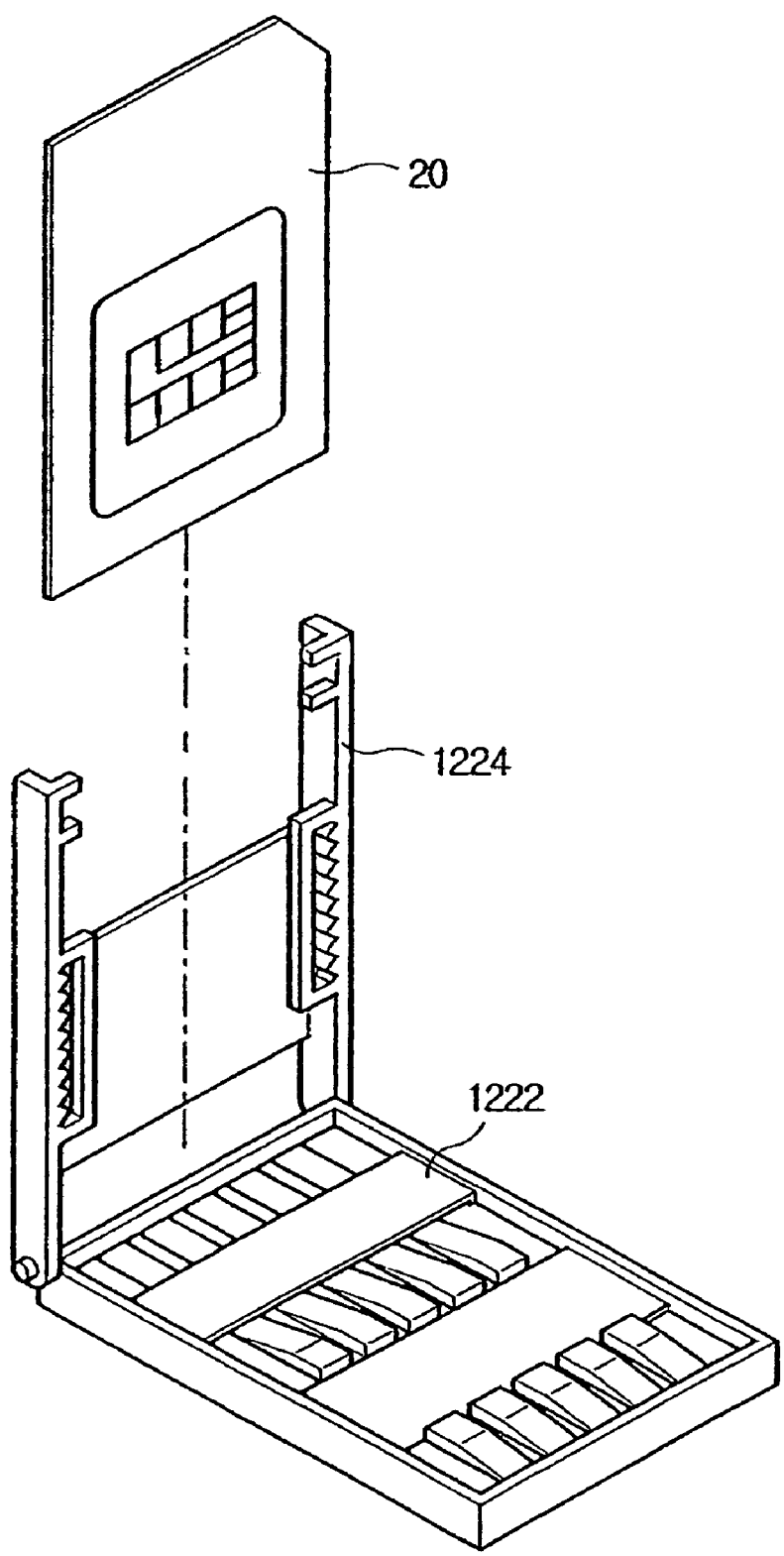
FIG. 3 is an exploded view of the contact-type connector according to one embodiment of the present invention.
Figure 4:
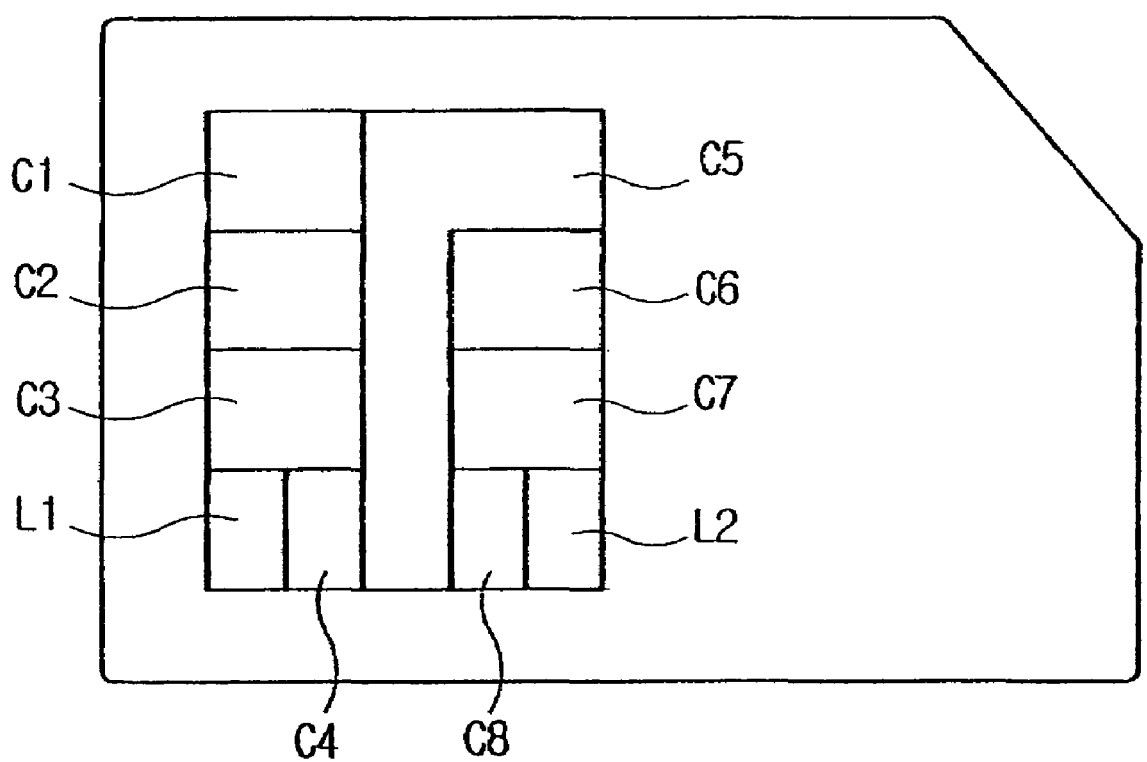
FIG. 4 shows the contacts of SIM-type smart card according to one embodiment of the present invention.

FIG. 3 is an exploded view of the contact-type connector according to one embodiment of the present invention, and FIG. 4 shows the contacts of SIM-type smart card according to one embodiment of the present invention.

The SIM-type connector 122 comprises a contact frame 1222 having plural contacts arranged to correspond to each contact of SIM-type smart card and an inserting frame 1224 having a pronged U-like shape or H-like shape of which one end is hinged to an end of the contact frame 1222.

The steps of inserting the SIM-type smart card with the SIM-type connector 122 are as follows: firstly, SIM-type smart card 20 is inserted into the inserting frame 1224 whose end is hinged to the contact frame 1222. After inserting the SIM-type smart card completely, the inserting frame 1224 is rotated to connect each contact of the SIM-type smart card and the contact frame 1222.

The SIM-type smart card used herein comprises L1 and L2 contacts besides C1 through C8 contacts according to ISO-7816 specification.

The function of each contact is shown in the following table:

| Number | Name | Function |
| --- | --- | --- |
| C1 | Vcc | Power supply |
| C2 | Reset | Reset signal input |
| C3 | CLK | External clock input |
| C4 | — | Reserved |
| C5 | GND | Ground |
| C6 | Vpp | Programming power input |
| C7 | I/O | Serial data input/output |
| C8 | — | Reserved |
| L1 | RF antenna | RF communication |
| L2 | RF antenna | RF communication |

L1 is formed adjacent to the left side (direction-wise the upper right corner of the smart card is the cutoff corner) of C4 contact and is electrically connected to RF-Inlay antenna 150 through SIM-type connector 122; L2 is formed adjacent to the right side of C8 contact and is electrically connected to RF-Inlay antenna 150 through SIM-type connector 122. L1 and L2 contacts are isolated from other C1 through C8 contacts electrically. In one embodiment, the contacts of SIM-type connector 122 corresponding to C4 and C8 contacts are electrically connected to L1 and L2 contacts. However, in another embodiment of the present invention, all contacts of the SIM-type smart card can be electrically connected to corresponding contacts of the SIM-type connector by adding new contacts and changing the arrangement of contacts.

The reasons why new contacts L1 and L2 for connecting RF-Inlay antenna are adopted in one embodiment of the present invention are as follows. Firstly, even though C4 and C8 contacts according to ISO-7816 are reserved for other use, some companies use these contacts for adopting a USB interface with the smart card. Thus, any modification or alteration is needed when the smart card having L1 and L2 contacts are used in the USB applications. Secondly, it is possible to develop various wireless applications supporting a fast and secure transaction, for example, payment for goods or a fee by connecting two contacts L1 and L2 to RF-Inlay antenna respectively and causing the SIM-type smart card to perform a wireless communication. Namely, it is not only convenient but also possible for a user to use various mobile services by allowing the user to carry several SIM-type cards at the same time.

Figure 5:
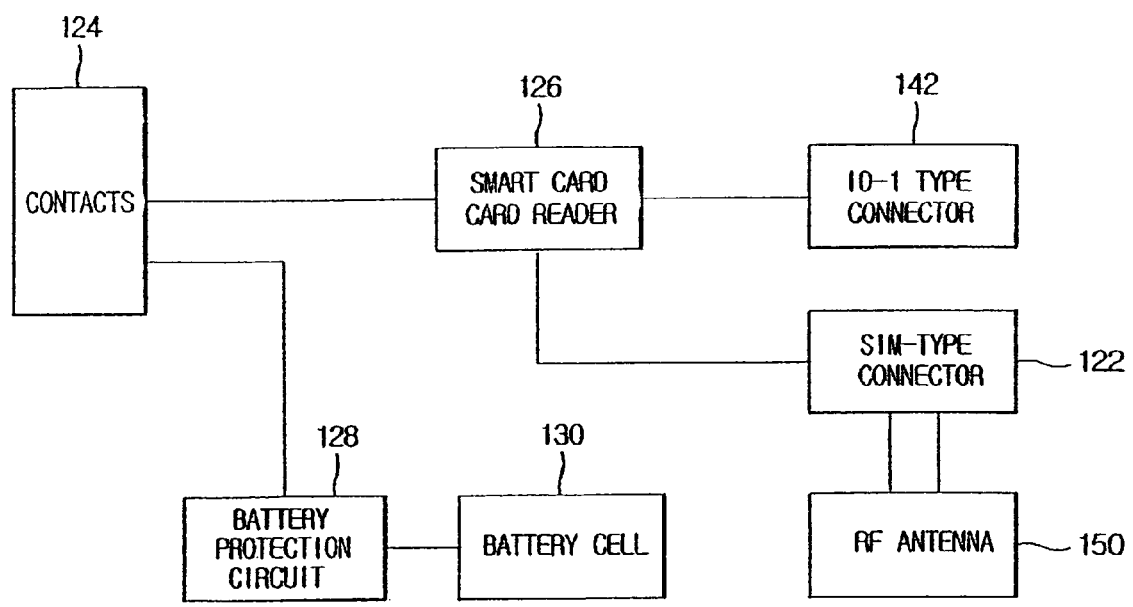
FIG. 5 is block diagram of the battery pack according to one embodiment of the present invention.

FIG. 5 is a block diagram of the battery pack according to one embodiment of the present invention. Referring to FIG. 5, the battery pack having a dual-type smart card interface according to one embodiment of the present invention is provided with a battery cell 130, an RF antenna 150, a ID-1 type connector 142, a SIM-type connector 126 coupled to RF antenna 150, an SCR 126 coupled to the ID-1 type connector 142 and SIM-type connector 122, a battery protection circuit 128 coupled to the battery cell 130, and plural contacts 124 coupled to the SCR 126 and the battery protection circuit 128.

The battery cell 130 supplies electrical power to the mobile communication terminal 10 and each part of the battery pack 100.

The RF-Inlay antenna 150 is located at an internal or external side of the battery pack 100, radiates the signal received from a non-contact SIM-type smart card that is electrically connected to the SIM-type connector 122, and transfers the signals received from other external devices to the SIM-type smart card.

The ID-1 type connector 142 is coupled to the SCR 122, and comprises plural contacts, which correspond to each of the contacts of the ID-1 type smart card 30, for reading or writing data from/to the ID-1 type smart card contained in the credit card. Furthermore, the sliding method is used to engage and disengage ID-1 type smart card 30 to/from the battery pack 100.

The SIM-type connector 122 is coupled to SCR 126 and RF antenna 150 respectively, and comprises plural contacts, which correspond to each of the contacts of SIM-type smart card 20, for reading or writing data from/to the SIM-type smart card 20. Furthermore, two contacts among the plural contacts are coupled to the RF antenna 150 and electrically connected to L1 and L2 contacts of the SIM-type smart card 20. Due to this connection, the SIM-type smart card 20 can communicate with other external devices by wireless. Other contacts that are not coupled to the RF antenna 150 are coupled to the SCR 126.

The SCR 126 is coupled to the ID-1 type connector 142 and the SIM-type connector 122 respectively, reads data from the smart card 20, 30 that is inserted into each connector 122, 142, and writes data received from the mobile communication terminal 10 to the smart card 20, 30. The SCR 126 transmits the data read from the smart card 20, 30 to the mobile communication terminal through the plural contacts 124. The SCR 126 is also coupled to an SCR control contact 124*d*, to allow the mode of the SCR 126 to switch to an operation mode or a power-down mode by the control signal transmitted from the mobile communication terminal 10 via the SCR control contact 124*d*. Accordingly, shutting down power of the SCR when a smart card is not used prolongs the expected life span of the battery pack.

The battery protection circuit 128 protects the battery cell 130 from potential malfunctions that can result from an instantaneous power surge.

Plural contacts 124 are coupled to the SCR 126 and the battery protection circuit 128 respectively, and the power supply to the mobile communication terminal 10 and communication between the SCR 126 and the mobile communication terminal 10 occur through these contacts 124.

The present invention is described with the embodiment of battery pack where both the ID-1 type smart card and the SIM-type smart card can be used at the mobile communication terminal.

As described above according to the battery pack having a dual-type smart card interface, it is possible to use a contact/non-contact SIM-type smart card and an ID-1 type smart card can be used at the mobile communication terminal without significant change of structure.

Additionally, because the conventional phone has an inserting hole formed on the rear side there is high possibility of malfunctioning resulting from dust infiltration, etc. However, according to embodiments of the present invention, the SCR for both the SIM-type smart card and the ID-1 type smart card is located in the battery pack, so the possibility of malfunctioning due to dust infiltration through the inserting holes of the SIM-type smart card and the ID-1 type smart card is remarkably reduced. Also, if the SCR included within the conventional phone is out of order, a user cannot use the phone nor the smart card; however, this problem can be easily resolved by just replacing the disabled battery pack with a normal one according to one embodiment of the present invention.

Also, according to one embodiment of the present invention, a contact-type SIM smart card can perform wireless communication the same as a non-contact type SIM smart card due to an RF antenna included within the battery pack.

While the above description has pointed out novel features of the invention as applied to various embodiments, the skilled person will understand that various omissions, substitutions, and changes in the form and details of the device of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A subscriber identity module (SIM)-type smart card for use with a battery pack of a mobile communication terminal, the SIM-type smart card comprising:
   C1 through C8 contacts arranged according to ISO-7816;
   an L1 contact configured to be electrically connected to an RF antenna of the battery pack via a SIM-type smart card connector of the battery pack, wherein the SIM-type smart card connector is electrically connected to the RF antenna; and
   an L2 contact configured to be electrically connected to the RF antenna via the SIM-type smart card connector,
   wherein the L1 and L2 contacts allow the SIM-type smart card to wirelessly communicate with an external device.

2. The SIM-type smart card as stated in claim 1, wherein the SIM-type smart card is either a non-contact credit card or a non-contact traffic card.

3. The SIM-type smart card as stated in claim 1, wherein the L1 and L2 contacts are formed adjacent to the C4 and C8 contacts, respectively.

4. The SIM-type smart card as stated in claim 3, wherein the L1 and L2 contacts are formed adjacent to the C3 and C7 contacts, respectively.

5. The SIM-type smart card as stated in claim 1, wherein the L1 and L2 contacts are electrically isolated from the C1 through C8 contacts.

6. The SIM-type smart card as stated in claim 1, wherein the L1 and L2 contacts are formed adjacent to the C3 and C7 contacts, respectively.

7. The SIM-type smart card as stated in claim 1, wherein each of the L1 and L2 contacts is smaller in size than those of the C1-C3 and C5-7 contacts.

8. The SIM-type smart card as stated in claim 1, wherein each of the L1 and L2 contacts is substantially the same in size as those of the C4 and C8 contacts.

* * * * *